(12) United States Patent
Krause

(10) Patent No.: US 11,353,075 B2
(45) Date of Patent: Jun. 7, 2022

(54) ELECTRIC ACTUATOR AND FINAL CONTROLLING DEVICE WITH AN ELECTRIC ACTUATOR

(71) Applicant: SAMSON AKTIENGESELLSCHAFT, Frankfurt (DE)

(72) Inventor: Sebastian Krause, Bruchköbel (DE)

(73) Assignee: Samson Aktiengesellschaft, Frankfurt (DE)

( * ) Notice: Subject to any disclaimer, the term of this patent is extended or adjusted under 35 U.S.C. 154(b) by 706 days.

(21) Appl. No.: 16/317,906

(22) PCT Filed: Jul. 11, 2017

(86) PCT No.: PCT/EP2017/067366
§ 371 (c)(1),
(2) Date: Jan. 15, 2019

(87) PCT Pub. No.: WO2018/011188
PCT Pub. Date: Jan. 18, 2018

(65) Prior Publication Data
US 2021/0293293 A1    Sep. 23, 2021

(30) Foreign Application Priority Data
Jul. 15, 2016   (DE) .......................... 102016113117.2

(51) Int. Cl.
F16D 67/06 (2006.01)
F16K 31/04 (2006.01)
(52) U.S. Cl.
CPC ............ *F16D 67/06* (2013.01); *F16K 31/047* (2013.01)
(58) Field of Classification Search
CPC .............................. F16D 67/06; F16K 31/047
See application file for complete search history.

(56) References Cited

U.S. PATENT DOCUMENTS

| | | | |
|---|---|---|---|
| 3,028,726 A * | 4/1962 | Jenkins ................. | F16K 31/046 60/709 |
| 4,823,926 A * | 4/1989 | Wittler .................... | F16D 67/06 188/73.38 |
| 9,162,094 B2 * | 10/2015 | Hsieh ....................... | E06B 9/70 |

FOREIGN PATENT DOCUMENTS

DE    37 08 470 C1    2/1988
DE    195 19 638 A1    12/1996
(Continued)

OTHER PUBLICATIONS

International Preliminary Report on Patentability dated Jan. 24, 2019, and English language translation.
(Continued)

*Primary Examiner* — Huan Le
(74) *Attorney, Agent, or Firm* — Banner & Witcoff Ltd.

(57) ABSTRACT

An electric actuator for a final controlling device having a safety actuator function for positioning an actuating element, (e.g. a valve element of, for example, a process-technical plant). The electric actuator can include an electric motor configured to provide a torque for actuating the actuating element. The electric motor can include a motor shaft configured to deliver the torque, an output shaft configured to transmit the torque from the electric motor to the actuating element, and an electromagnetic and/or currentlessly uncoupling coupling (e.g. electromagnetic and/or currentlessly uncoupling clutch) configured to provide and/or interrupt a torque-transmitting connection between the motor shaft and the output shaft. The output shaft, the motor shaft and the coupling can be arranged coaxially to one another.

14 Claims, 4 Drawing Sheets

(56) References Cited

FOREIGN PATENT DOCUMENTS

| DE | 10134428 A1 | 1/2003 |
| DE | 102 56 534 A1 | 7/2004 |
| EP | 3851163 A2 | 7/1998 |
| EP | 2 177 801 A1 | 4/2010 |
| EP | 2 784 361 A1 | 10/2014 |

OTHER PUBLICATIONS

Foreign office action dated Mar. 9, 2017, Application No. 10 2016 113 117.2.
International Search Report dated Oct. 24, 2017, International Application PCT/EP2017/067366.

* cited by examiner

US 11,353,075 B2

ELECTRIC ACTUATOR AND FINAL CONTROLLING DEVICE WITH AN ELECTRIC ACTUATOR

CROSS REFERENCE TO RELATED APPLICATIONS

This application is a National Stage of International Application No. PCT/EP2017/067366, filed Jul. 11, 2017, which claims priority to and the benefit of German (DE) Patent Application No. 102016113117.2, filed Jul. 15, 2016, each of which is incorporated herein by reference in its entirety.

BACKGROUND

Field

The disclosure relates to an electric actuator for a final controlling deice with safety control function for positioning an actuating element, such as a valve member, a process-technical plant, such as a chemical plant, for example a petrochemical plant, a power plant, a food processing plant, a heating plant, such as a heating plant for a building, a part of a building, such as an apartment, or a room of a building, or the like. The disclosure also relates to final controlling device with a safety control function which comprises an actuating element, such as a valve element, of a process-technical plant and an electric actuator according to the disclosure.

Related Art

For example, a final controlling device with an electric actuator is known from DE 195 19 638 A1. The well-known final controlling device comprises a valve actuator with a safety control function for actuating a valve. The well-known control valve is equipped with a drive motor that can be reversed in the direction of rotation and whose drive force can act via a gear on a plunger to actuate the valve. The final controlling device shall also include an electromagnetic brake or coupling (e.g. clutch) and a spring mechanism acting on the plunger which, during normal operation of the final controlling device, is coupled to the driving motor by the action of the electromagnetic brake or coupling. In the event of a power failure, the valve of the known final controlling device is moved for safety reasons into a defined, usually closed, valve position by releasing the electrical coupling between the electric motor and the plunger, so that the spring mechanism acts on the plunger to bring the valve into its defined (closing) position. In the case of the known final controlling device and other class-compliant final controlling devices with fail-safe action, it is imperative that the electric motor be configured so that it provides sufficient minimum torque to move the actuating element to a set point position despite the continuous action of the spring mechanism, which urges the valve toward the closed position. The known final controlling device has proven itself in practical application and enjoys great popularity. However, there is a desire to provide the functionality of the well-known actuator in a smaller space, while keeping the acquisition and maintenance costs of the actuator as low as possible.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1A:
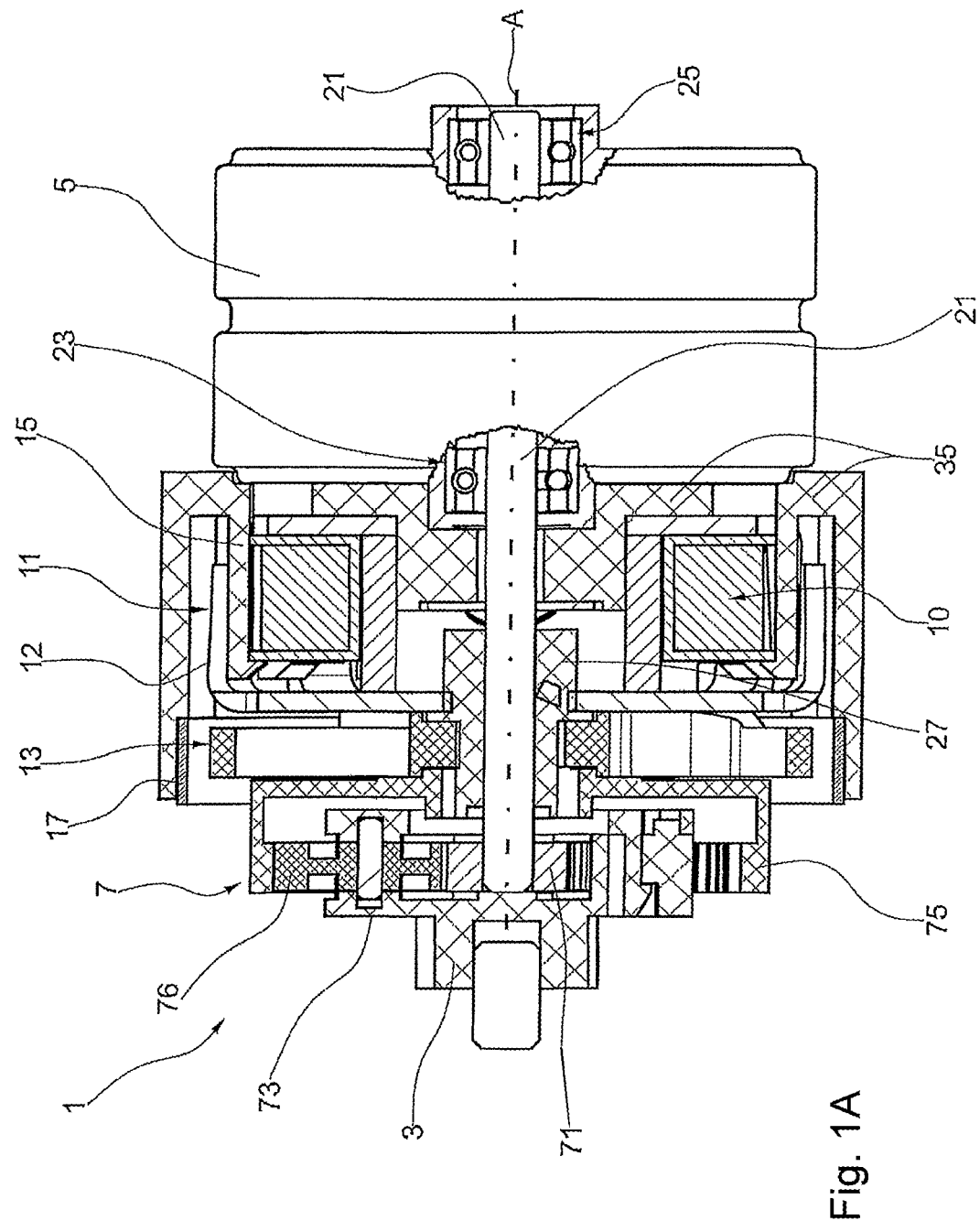
FIG. 1A illustrates a sectional view of an electric actuator according to an exemplary embodiment of the present disclosure.

The exemplary embodiments of the present disclosure will be described with reference to the accompanying drawings. In the drawings, the same or similar reference signs are used for identical or similar components.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide a final controlling device with a safety control function or an electric actuating element for a final controlling device with a safety control function that overcomes the disadvantages of the state of the art and in which, in particular, the required installation space is reduced; preferably while simultaneously maintaining or reducing the acquisition and operating costs.

Accordingly, in one or more exemplary embodiments of the present disclosure, an electric actuator is provided for a final controlling element with safety control function for positioning an actuating element, such as a valve member, of a process-technical plant, a chemical plant, in particular a petrochemical plant, a power station, a food processing plant, a heating plant or the like. The electric actuator includes, in an exemplary embodiment, an electric motor for providing a torque for actuating the actuating element, the electric motor having a motor shaft for delivering the torque, a drive shaft for transmitting the torque from the electric motor to the actuating element, and a coupling (e.g. clutch) for providing and/or interrupting a torque transmitting connection between the motor shaft and the drive shaft.

In an exemplary embodiment, the coupling is realized as a currentless decoupling coupling, such as a currentless decoupling clutch. This can be particularly advantageous if the safety control function is to be activated in the event of a power failure, a failure of an electrical signal, or the like. Alternatively or additionally, the coupling may be an electromagnetic coupling (e.g. electromagnetic clutch). In an exemplary embodiment, an electromagnetic coupling/clutch can be realized, for example, with two soft magnetic cages and a coil, preferably the coil and one of the cages being held stationary (fixed to the housing), in particular rotationally fixed relative to a stationary part of the electric motor, the second cage being rotatable relative thereto and being connected to the torque-transmitting connection between the motor shaft and the drive shaft. When the current flows through the coil of the electromagnetic clutch, the two soft magnetic cages can exert a mutual holding torque on each other. In an exemplary embodiment, the electric actuator according to the disclosure comprises exactly one electric motor. For example, a 50 Hz synchronous motor can be used as an electric motor, which is particularly suitable for use with the power supply of the standardized European 50 Hz power grid, whereby no additional transformers are required to adapt the mains current to the motor. Alternatively, a DC motor can be used as an electric motor.

In an exemplary embodiment, the drive shaft, the motor shaft and the coupling/clutch are arranged coaxially to each other. Surprisingly, it has been shown that when the coupling/clutch is arranged coaxially to the motor shaft and drive shaft, the required installation space of an electric actuator according to the disclosure, as well as the number of individual components, can be significantly reduced compared to a conventional electric actuator. An advantage of the inventive actuator is that it allows the components of an actuator to be arranged on a smaller number of axes than usual by dispensing with the separate axis of the coupling required by the state of the art. In an exemplary embodiment, the (mains) current-supplied part of the electric motor and/or the coupling may be stationary, in particular opposite a housing of the electric actuator or final controlling device. In this way it is avoided that the costs for wiring the (mains) supplied parts of the electric motor and possibly the electromagnetic coupling require an increased investment.

In an exemplary embodiment, the electric actuator also comprises a gear, in particular a planetary gear, preferably arranged coaxially with the drive shaft, for transmitting the torque from the electric motor to the drive shaft, the motor shaft providing the torque to be transmitted, in particular the drive torque, from the electric motor to the gear. Other gears are also conceivable. In an exemplary embodiment, the gear is made up of several gear components that move relative to each other, such as a torque input gear component, a torque output gear component and/or a torque transmission gear component or torque transfer component. The motor shaft can be connected to a torque input gear component in a torque-proof manner, in particular by means of material, positive or non-positive locking. It is clear that a reduction or transmission gear provides an output torque to the input shaft that is different from the input torque directly applied to the shaft emanating from the motor. In this respect, a distinction can be made between input torque on the input side of a gearbox and output torque on the output side of the gearbox remote from the motor. However, it is clear that, if the term torque is generally used, this term can include both drive torque and output torque as well as, if necessary, drive torques and output torques in the presence of several gear stages. It is clear to the person skilled in the art that all the power supplied to the final controlling device is present at the output of the electric motor in the form of the drive speed and the drive torque present there, and that this power cannot be exceeded in one or more gear stages, regardless of any possible overruns or reductions, and defines the torque of the electric motor supplied by the electric motor to actuate the final controlling device.

In an exemplary embodiment, the gear of the electric actuator includes exactly one gear stage. In an exemplary embodiment, the gear of the electric actuator is designed as a reduction gear, in particular with exactly one reduction gear stage. The reduction gear preferably has a reduction ratio of at least 2, 3, 5, 7 or 9. A gear designed as a reduction gear is particularly suitable for converting a low input torque at a high input speed into a higher output torque at a lower output speed. The gear unit is particularly preferred as it is not self-locking. A non-self-locking gear is particularly suitable for combination with a spring mechanism on the output side of the gear to move the actuating element to the fail-safe position.

In an exemplary embodiment, the reducing gear is configured as a planetary gear. A planetary gear comprises (as gear components) a central, coaxial sun gear, an outer, internally toothed, coaxial ring gear and at least one planet gear, preferably a plurality of planet gears, in particular an odd number of planet gears, for example three or five planet gears, which are arranged between the sun gear and the ring gear and are in engagement with the ring gear and the sun gear. A planetary gear further comprises (as a further gear component) a planet bridge connected to the at least one planet gear or the plurality of planet gears, the planet gear or gears being rotatably supported on the planet bridge about their planet gear axis, preferably a shaft or axle body of the planet bridge. In particular, the output shaft can be realized at least in sections as planet bridge of the gear. Alternatively, a planet bridge of the planetary gear in particular can be connected directly to the output shaft in a torque-transmitting manner, preferably torque-proof, force-locking and/or positive-locking manner. In addition or alternatively, the motor shaft can be connected to the sun gear of the planetary gear in a rotationally fixed manner. Such a design of the gearbox as a planetary gear with driven sun gear and drifting planetary gears with preferably fixed ring gear is particularly suitable for a relatively high reduction ratio.

In an exemplary embodiment, which can be combined with the embodiment described above (and/or one or more other embodiments described herein), a gear component, preferably a ring gear, of the gearbox, which may be configured as a planetary gear, is rotationally fixed against a rotationally movable part of the coupling. In an exemplary embodiment, in this configuration of an electric actuator, the coupling/clutch comprises a fixed coupling part relative to the electric motor and/or the actuator housing. The coupling can be functionally subdivided into a rotationally movable part, which can carry out a rotational movement with together at least a part of the torque transmitting connection between motor shaft and drive shaft, and a stationary coupling part, which is preferably stationary and/or housing fixed. In combination with the gear described above, in particular realized as a planetary gear, such a coupling/clutch offers the advantage that a gear component of the gear, in particular the ring gear of the planetary gear, can optionally be realized stationary in order to provide a power transmitting connection between the motor shaft and the output shaft, or alternatively, when the coupling is open, the gear component, in particular the ring gear, can be free-running, so that other gear components, such as the planet gears between the sun gear and the ring gear, run freely, so that practically no torque is transmitted between the motor shaft and the output shaft.

In an exemplary embodiment, the electric motor is designed with a preferably constant nominal speed of at least 200 rpm, at least 500 rpm, at least 1000 rpm, at least 3000 rpm or at least 6000 rpm. The direction of rotation of the electric motor can be reversed in a preferred version of an actuator according to the disclosure. Preferably, the electric motor is a synchronous motor designed for operation in a 50

Hertz mains supply. According to an alternative preferred design, the electric motor can be a DC motor.

In an exemplary embodiment, a centrifugal brake, preferably arranged coaxially to the drive shaft, is non-rotatably connected to the gear and/or coupling. In particular, the centrifugal brake can be rotationally fixed to a gear component, in particular the ring gear, of the gear unit. When using the electric actuator according to the disclosure as part of a final controlling device with safety control function, it has proved advantageous to provide a centrifugal brake, which preferably does not generate any braking force during operation, i.e. when the actuating element is actuated by the electric motor. It has also been shown to be advantageous that a centrifugal brake is configured to provide a braking force, preferably a braking force dependent on the acceleration of the output shaft, when the safety control function is performed by the final controlling device, which preferably performs its braking function above an acceleration limit value in order to prevent damage to the final controlling device as a result of excessively high accelerations. In an exemplary embodiment, the electric actuator comprises a brake pot cooperating with the centrifugal brake, which is fixed to a housing and/or fixed relative to the stationary part of the coupling or the electric motor.

In an exemplary embodiment, the motor shaft extends in an axial direction from the gear, in particular the gear input component or torque input component, in particular the sun gear of a planetary gear, to the electric motor, preferably in and/or through the stationary part of the electric motor. The motor shaft should preferably extend completely through the coupling, its stationary and/or rotating part and/or, where appropriate, through the centrifugal brake, its rotating part and/or its brake pot. In this arrangement, the motor shaft penetrates the coupling and, if necessary, the centrifugal brake in the axial direction. This preferred arrangement allows a particularly compact design of the actuator.

In an exemplary embodiment, the motor shaft is surrounded by a sleeve or hollow shaft in axial sections in the radial direction, preferably completely. In particular, the hollow shaft is rotationally movable relative to the motor shaft and/or mounted on the motor shaft. A bearing of the hollow shaft on the motor shaft can preferably be realized as a plain bearing. The hollow shaft is preferably non-rotatably connected to a gear component, preferably a torque transmission component or torque transfer component, in particular the ring gear, the rotationally movable part of the centrifugal brake and/or the rotationally movable part of the coupling. The use of a hollow shaft surrounding the motor shaft for torque transmission between a gear component, in particular the ring gear, the gear equipped in particular as a planetary gear and the coupling and, if appropriate, the centrifugal brake, improves the bearing stability of the rotating parts, i.e. the bearing of the motor shaft during actuating operation and, if the safety actuating function is triggered, the rotary movement of the hollow shaft with the coupling seated thereon and, if appropriate, the centrifugal brake.

In an exemplary embodiment, which can be combined with the embodiment described above (and/or one or more other embodiments described herein), the motor shaft extends at least partially through a stator and/or a rotor of the electric motor, the motor shaft preferably being mounted rotatably in the axial direction on both sides of the electric motor. Preferably one roller bearing, in particular one ball bearing, is provided on each side of the electric motor for the rotatable bearing of the motor shaft in axial direction. The use of a particularly long special shaft as the motor shaft for transmitting the torque from the electric motor to the actuator allows further components, in particular the clutch, to be arranged between the electric motor and the actuator or a gear unit connected upstream of the actuator, for example a reduction gear unit such as a planetary gear unit, in a space-saving manner. In an exemplary embodiment, at least 25%, at least 33%, at least 40% or at least 50% of the motor shaft extends axially outside the motor. In an exemplary embodiment, which can be combined with the previous one (and/or one or more other embodiments), the extension of the motor shaft in the axial direction is at least 25%, at least 33%, at least 40% or at least 50% greater than the axial extension of the electric motor. Surprisingly, when using such extra-long special shafts, it has proved to be advantageous in terms of the stability of the shaft and its rotational movement to provide bearings which may preferably have a stationary part connected to a housing of the electric motor. Due to the very high speeds which can be achieved, for example, by the preferred synchronous motors or DC motors, from several hundred to more than a thousand revolutions per minute, rolling bearings such as ball bearings are particularly suitable for bearings.

The disclosure also concerns a final controlling device with safety control function which comprises an actuating element, such as a valve member, for adjusting a process fluid flow of a process-technical plant, such as a chemical plant, for example a petrochemical plant, a food processing plant, a power plant, a heating plant, for example a floor heating or central heating or the like, as well as an electric actuator as described above. In particular, the final controlling device may have an eccentric actuated by the output shaft for linear actuation of the valve member. Alternatively, the final controlling device may have a spindle drive which can be actuated by the output shaft, such as a threaded spindle, for linear actuation of the valve member.

In an exemplary embodiment, a final controlling device includes a spring mechanism, in particular a rotary spring mechanism, for moving the actuating element into a safety position, in particular when the coupling and/or the electric motor is de-energized, the spring mechanism preferably being arranged coaxially with the output shaft and/or the motor shaft. In an exemplary embodiment, the spring mechanism can be arranged on both sides relative to the gear described above.

In an exemplary embodiment, the final controlling device has a final controlling device housing which comprises two housing halves. In particular, the first half of the body shell may preferably contain the complete electric actuator according to the disclosure. In an exemplary embodiment, all power connections of the final controlling device may be provided in the first half of the housing shell. In an exemplary embodiment, an output eccentric and, if necessary, a spring mechanism, in particular coaxial to the motor shaft, are accommodated in a second half of the housing shell. In such a configuration, the final controlling device comprises a motor shaft defining the drive axis and a bearing shaft for defining the axis of rotation of the output eccentric, the axis of rotation of the output eccentric being coaxial with the drive axis. Such a configuration makes it possible to realize a particularly compact actuator.

According to an alternative configuration of a final controlling device according to the disclosure, the actuator and the output eccentric may be provided with the axis of rotation of the eccentric and the drive axis arranged in parallel and, in particular, housed within the same housing shell, preferably with separate chambers for receiving the actuator according to the disclosure on the one hand and the output eccentric on the other hand. In the second alternative configuration of a final controlling device, the bearing axis, which determines the axis of rotation of the eccentric, can be supported on both sides of the eccentric on the final controlling device housing, so that a particularly stable eccentric bearing can be achieved, which in particular prevents the transmission of eccentric imbalances to the output shaft of the final controlling drive. In this alternative configuration of a final controlling device according to the disclosure, at least one torque-transmitting component, such as a spur gear, can be provided between the output shaft of the actuator and the output eccentric. In an exemplary embodiment, such a spur gear is configured as a two-stage reduction spur gear.

In an exemplary embodiment of the final controlling device, a further gear, in particular a planetary gear and/or reduction gear, preferably a multi-stage planetary gear, in particular with driven sun gear or sun gears and/or driven planet gear bridge or bridges, may be provided upstream of the output eccentric. If the final controlling device housing is realized according to the second alternative, the further gear is preferably located in the eccentric chamber of the housing. In an exemplary embodiment, the further gear is a planetary gear, in particular a multi-stage, preferably two-stage planetary gear. In particular, several gear units can be used for reduction in an actuator, i.e. further gear units in addition to the gear unit of the actuator, whereby, for example, a high overall reduction ratio of at least 100, at least 500, at least 1000, at least 2000 or even at least 5000, preferably 500 to 3000, in particular 1000 to 2000, can be achieved.

Figure 1B:
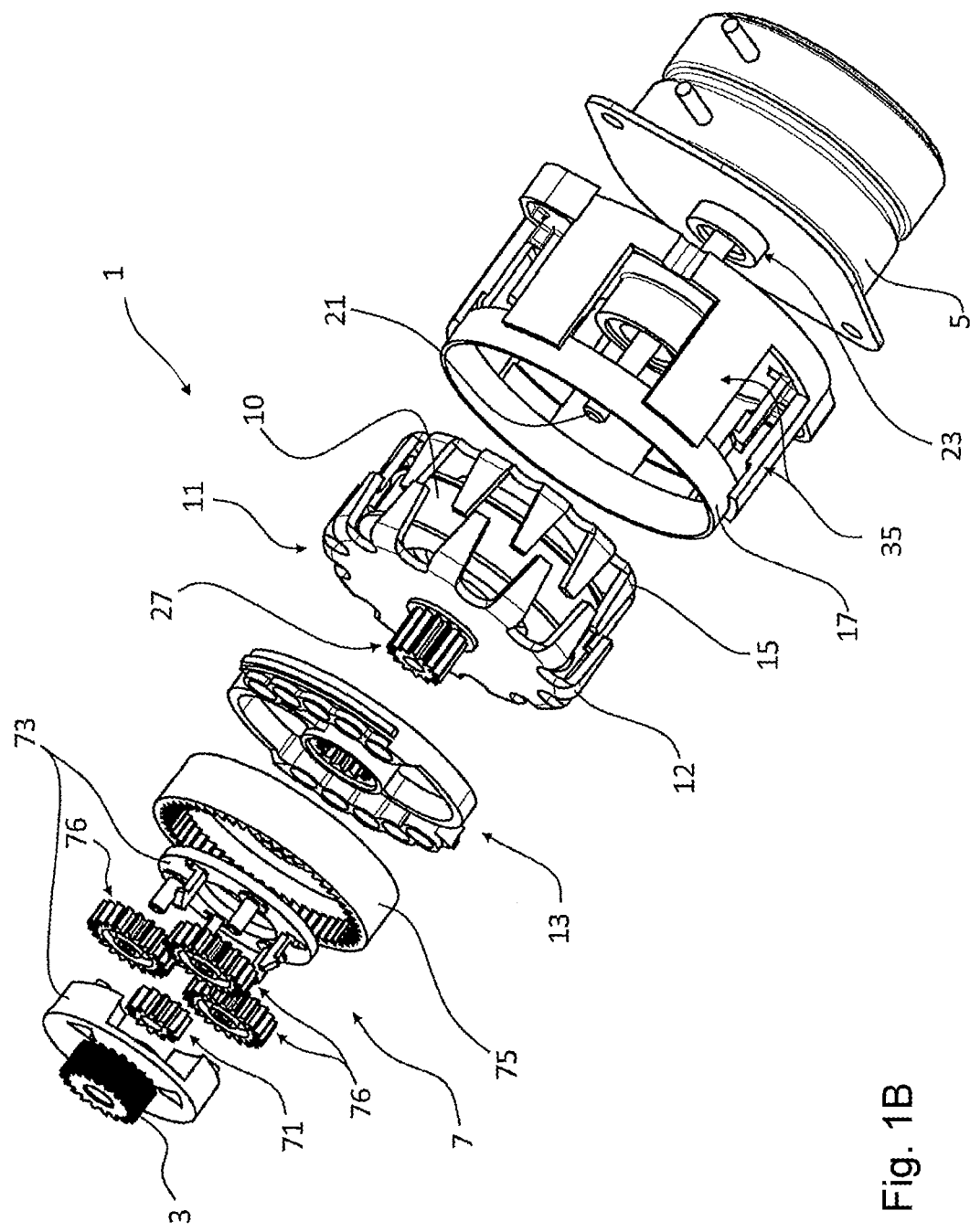
FIG. 1B illustrates an exploded view of the actuator according to FIG. 1A.

FIGS. 1A and 1B illustrate an actuator 1 according to an exemplary embodiment. In an exemplary embodiment, the actuator 1 includes an electric motor 5 with a motor shaft 21, an output shaft 3, and an electromagnetic coupling 11, which provides a torque-transmitting connection from the motor shaft 21 to the output shaft 3 when energized. The motor shaft 21 and the output shaft 3 are arranged coaxial to each other. Their respective or common axis of rotation defines the motor axis A. In an exemplary embodiment, the electromagnetic coupling 11 is an electromagnetic clutch 11.

Ball bearings 23, 25 are mounted on both sides of the housing of the electric motor 5 in the direction of the motor axis A for the rotationally movable mounting of the motor shaft 21 relative to the stationary part of the electric motor 5. The motor shaft 21 extends in axial direction A completely through the stationary part of the electric motor 5 up to the gear. In an exemplary embodiment, the gear is realized as planetary gear 7, which comprises as gear components a sun gear 71, three planet gears 76, a ring gear 75 and a planet gear bridge 73. The sun gear 71 of the planetary gear 7 is rotationally fixed to the motor shaft 21 and serves as the gear input component. The drive torque applied by the motor 5 to the motor shaft 21 is transferred via the sun gear 71 to the planetary gear 7 in order to be transmitted via the planetary gear 7 to the output shaft 3 and from there further in the direction of the actuating element not shown in FIG. 1A.

When the electromagnetic coupling 11 of the actuator 1 is energized, the ring gear 75 of the planetary gear 7 stands still. The ring gear 75 of the planetary gear 7 is connected to a rotating part 12 of the electromagnetic coupling 11 via a hollow shaft 27. In the energized state of the electromagnetic coupling 11, an electromagnet 10 creates holding forces between the stationary part 15 and the moving part 12 of the electromagnetic coupling 11. The stationary part 15 and the moving part 12 of the electromagnetic coupling 11 are realized as soft magnetic claws. The stationary part, also known as the stationary part 15, is non-rotatably connected to the stationary part of the electric motor 5 and the housing 35 of the actuator. The actuator housing 35 is designed, as shown below, to be rotationally fixed in a final controlling device housing (135, 135'), e.g. to be flange-mounted. The actuator housing 35 can also be referred to as the mounting section or actuator flange. Electromagnet 10 is part of stationary part 15 of electromagnetic coupling 11. Both electromagnet 10 of coupling 11 and electric motor 5 can be supplied with power by stationary power lines that do not require rotational movement.

The hollow shaft 27 completely surrounds the motor shaft 21 in radial direction. A sliding fit can be provided between the hollow shaft 27 and the motor shaft 21. A centrifugal brake 13 is provided on the hollow shaft 27 in axial direction A between the ring gear 75 and the rotating part 12 of the electromagnetic clutch 11. The centrifugal brake 13 is connected to the hollow shaft 27 so that it cannot rotate. Radially relative to the axial direction of the motor axis A, surrounding the centrifugal brake 13, a brake pot 17 is provided in the actuator housing 35, with which the centrifugal brake 13 can come into friction contact to generate a braking force. The centrifugal brake 13 comprises two brake arms arranged rotationally symmetrically to each other, in the radially outer section of which recesses, e.g. bores, are provided for accommodating weights, e.g. cylindrical pins, e.g. made of metal, in particular lead. The pot 17 is preferably pressed into the actuator housing 35 and can in particular be held rotationally fixed against the mounting section 35. A spline shaft connection, a non-circular connection, a press connection, a toothed shaft connection or the like, for example, can be provided for the rotationally fixed connection of the hollow shaft 27 with the components arranged radially on the outside, i.e. the rotationally movable coupling part 12, the centrifugal brake 13 and/or the ring gear 75.

When the ring gear 75 of the planetary gear 7 of the actuator 1 shown in FIGS. 1A and 1B is stationary because it is held stationary by the current-controlled clutch 11 with respect to the housing and the electric motor 5, the planet gears 76 can roll in the ring gear 75 driven by the movement of the sun gear 71. The ring gear 75 and the planet gears 76 act as torque transmission gear components. The rolling motion of the planet gears 76 also moves the planet gear bridge 73, which rotatably supports the planet gears 76. The planet gear bridge 73 shown in FIG. 1B is made up of two parts and, when assembled, forms a cage structure for holding the planet gears 76. The two halves of the planet gear bridge 76 can be firmly connected by means of a snap-in or snap-in connection. The planet gear bridge 73 has pins for carrying the planet gears 76. The output shaft 3 is designed in one piece with the planet gear carrier 73 and has a gear profile on the outside. The output shaft 3 can transmit the output torque of the planetary gear 7 via its gearwheel outer profile. The planet gear carrier 73 implements a gear output component or torque output component.

When the coupling 11 of actuator 1 is opened, which in the embodiment shown can be achieved by de-energizing the electromagnetic coupling 11, the rotary part 12 of coupling 11 can move independently of the stationary part 15 of electromagnetic coupling 11. The electromagnetic coupling 11 then does not exert any holding or braking force on the rotating clutch part 12. This also eliminates the holding force that holds the ring gear 75 stationary. If the ring gear 75 is not held stationary by the coupling 11, the ring gear 75 can be rotated freely. When the ring gear 75 is freely rotatable, the planetary gears 76 do not roll in the ring gear 75. By uncoupling the coupling 11, the rotary motion of the output shaft 3 can be transmitted directly to the ring gear 75 via the planet gear bridges 73 and the planet gears 76. When the coupling 11 is decoupled, the ring gear 75 rotates with the output shaft 3.

If the ring gear 75 is not fixed, no or only very small torques are transmitted from the sun gear 71 via the planet gears 76 to the planet gear bridge 73. If the ring gear 75 runs free, the planet gears 76 can run free within the ring gear 75, so that a movement of the sun gear 71 causes no or only a very small rotational movement of the planet gear bridge 73.

If a torque is applied to the output shaft 3 on the side of the gear remote from the motor, for example by an actuator return spring, this torque can be applied unhindered to the output shaft 3 by an input torque of the electric motor 5 when the coupling 11 is decoupled. It is clear that instead of the electromagnetic coupling 11 shown here, a different type of clutch may be used to provide and/or interrupt a torque-transmitting connection between the motor shaft 21 and the output shaft 3, for example a friction clutch, a claw clutch or the like.

In an exemplary embodiment, the electric motor 5 of the actuator 1 is dimensioned in such a way that a low torque from the electric motor 5 acts on the motor shaft 21 even when the current is not applied. Such a minimum torque can, for example, be provided by an electric motor configured as a synchronous motor or DC motor through its permanent magnets. If the coupling were closed even in the de-energized state, the minimum torque of the motor due to the high transmission ratio and speed through the gear may be sufficient to cause self-locking of the actuator 1 against actuation of the output shaft 3 by the spring mechanism. Such safety-critical self-locking is avoided by uncoupling the coupling to interrupt the torque-transmitting connection.

If a torque is applied to the output shaft 3 by a torque from the side remote from the drive with the coupling 11 open, this accelerates the output shaft 3 in the direction of rotation of the torque remote from the drive. The output shaft 3 also rotates the rotating ring gear 75, which is connected to the centrifugal brake 13 in a rotationally fixed manner. The centrifugal brake 13 is designed to provide an acceleration-dependent braking effect. The higher the acceleration of the centrifugal brake 13, the further the centrifugally applied brake arms of the centrifugal brake 13 move radially outwards until they come into sliding contact or friction contact with the brake drum 17 at a designable acceleration limit value in order to develop the braking effect of the centrifugal brake 13. In this way, the centrifugal brake 13 prevents dangerous abrupt movements due to high accelerations.

Figure 2:
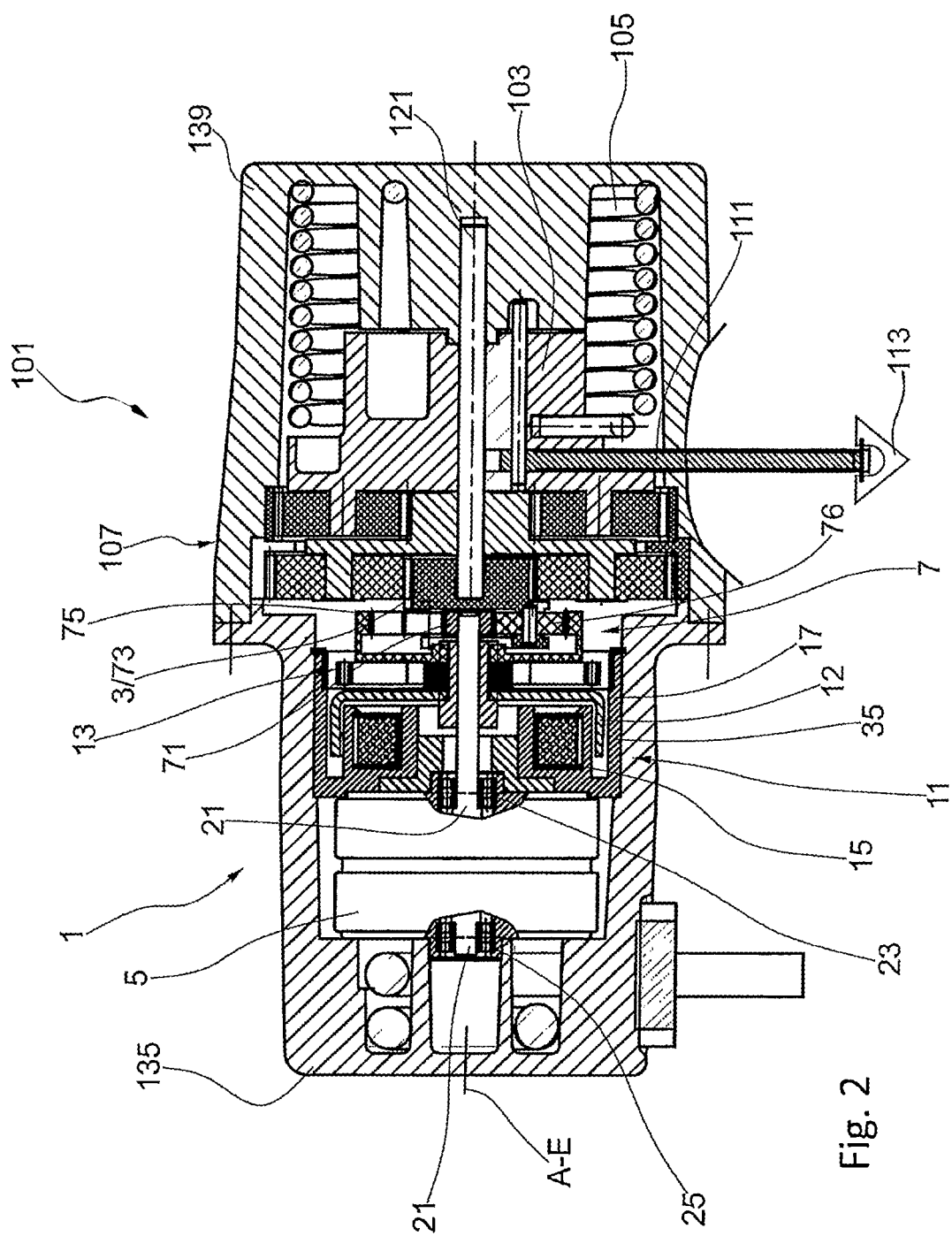
FIG. 2 illustrates a final controlling device according an exemplary embodiment including an actuator according to FIG. 1A.
Figure 3:
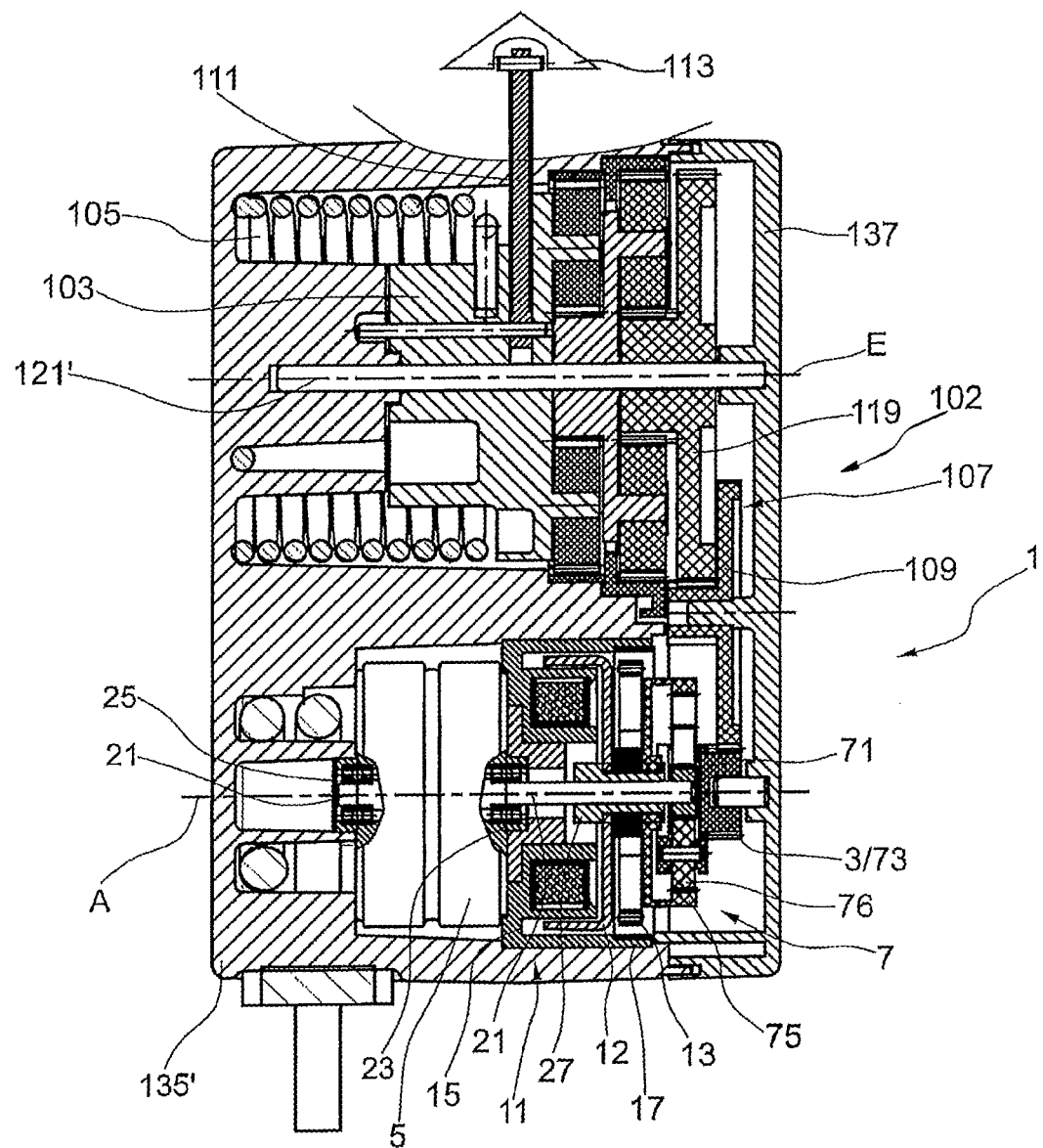
FIG. 3 illustrates a cross-sectional view of a final controlling device according to an exemplary embodiment including an actuator according to FIG. 1A.

The different actuators 101, 102 according to the disclosure shown in FIGS. 2 and 3 each comprise an actuator 1 as described above. For ease of reading and to avoid repetition, the same or similar reference signs are used below for the same or identical components.

The final controlling device 101 according to FIG. 2 comprises as its main components an actuator 1 with an electric motor 5, a motor shaft 21, an output shaft 3 and a coupling 11 for providing and/or breaking a torque transmitting connection between the motor shaft 21 and the input shaft 3.

As a further main component, the final controlling device 101 as shown in FIG. 2 comprises an actuating element, which is only schematically shown as control valve 113 in FIG. 2. The control valve 113 of the final controlling device 101 is designed to perform a translational movement. The control valve 113 of the final controlling device 101 is actuated by a plunger 111 of the final controlling device 101, which is supplied with the torque of the electric motor via an eccentric 103. The eccentric 103 is mounted so that it can rotate about an eccentric bearing axis 121. The eccentric 103 is designed in particular to carry out a maximum rotary movement amplitude of less than 180°, preferably less than 135°, in particular less than 90°. The rotary movement of the eccentric 103 is translated into a translatory actuating element movement via plunger 111.

A rotation spring mechanism 105 is permanently connected to the eccentric 103. The spring mechanism 105 is designed to move the eccentric 103 in such a way that the control valve 113 is moved to a predetermined fail-safe position. This fail-safe position can, for example, be a fully open valve position or a fully closed valve position. The spring mechanism 105 comprises a torsion spring which is supported on the one hand by the eccentric housing 139 and on the other hand is firmly connected to the eccentric 103. The spring mechanism 105 can be configured to maintain a predetermined safety spring force excess in the predetermined safety position, so that a sufficient closing force is guaranteed, especially in a safety closing position.

The eccentric 103 is completely housed in the eccentric housing 139. The eccentric bearing axis 121 is surrounded in its axial direction and completely by the eccentric housing 139. The spring mechanism 105 is completely surrounded by the eccentric housing 139 along its axial spring height and in the circumferential direction.

Actuator 1 is surrounded by actuator housing 135. The drive axis A, defined by the motor shaft 21, is arranged coaxial to the eccentric bearing axis 121 and the eccentric axis E defined by the eccentric bearing axis 121 in the configuration according to FIG. 2. The axis of rotation E of the eccentric 103 is arranged coaxially to the motor axis A. The drive housing 135 and the eccentric housing 139 are oriented coaxially to each other and fastened to each other on the end face, for example screwed together. The output shaft 3 of the actuator 1 is a gear-like extension connected in one piece to the planet gear bridge 73 of the planetary gear 7 and can protrude in axial direction A from the actuator housing 135.

The output shaft 3 of actuator 1 can be connected directly or indirectly to the eccentric 103 to transmit torque. In the exemplary embodiment of the final controlling device 101 as shown in FIG. 2, torque is transmitted from the output shaft 3 to the eccentric 103 indirectly via a further gear 107, which is realized as a two-stage planetary gear. The other gear unit 107 is equipped with eccentric housing (139)-fixed ring gears in which planetary gears roll. The output shaft 3 acts as the sun gear of the first gear stage of the second gear stage 107. The eccentric bearing axis 121 extends from the eccentric housing 139 into the output shaft 3 to support the eccentric 103 and the second gear stage 107. On the eccentric bearing axle 121, the central planet bridge and the sun gear formed in one piece with it, which connects the two planetary gear stages of the other gear unit 107 with each other, are also rotatably mounted.

The eccentric 103 has pins for the rotatable bearing of the second planet gears of the further gear 107. The further gear 107 has a further reduction. The input torque of the electric motor 5 is converted by the planetary gear 7 of the actuator 1 into the output torque at the output shaft 3.

The output torque of the final controlling device acts as input torque on the further gear 107 and is converted by the further gear 107 into an output torque applied to the eccentric 103 with which the eccentric 103 actuates the plunger 111 and thus the valve member 113. As described above, torque is transmitted from the electric motor 5 of the actuator 1 to the eccentric 103 of the final controlling device 101 only when the coupling 11 is closed. If the coupling 11 is opened, in the configuration described here, for example by switching the electromagnetic coupling 11 de-energized so that the electromagnetic holding force between the stationary clutch part 15 and the rotary clutch part 12 is eliminated, the ring gear 75 of the planetary gear 7 of the actuator 1, which is connected to the rotary clutch part 12, is also no longer stationary and can therefore essentially rotate freely. The torque from the electric motor 5 is then practically no longer transmitted from the sun gear 71 to the planet gear bridge 73.

When the coupling 11 is de-energized and open, the spring mechanism 105 continues to exert its torque on the eccentric 103. This spring-loaded torque causes the control valve 113 to move to the predetermined fail-safe position as described above. The rotational movement of the eccentric 103 about the axis of rotation E of the eccentric 103 results in a movement of the pins of the eccentric 103, which support the hollow gears of the further gear 107. As a result of the eccentric movement 103, a movement of the further gear 107 takes place, which is transmitted to the output shaft 3. The output shaft 3 is configured, as described above, as a gear-like extension of the planet gear bridge 73 of the planetary gear 7, the rotational movement of which, when the coupling 11 is opened, is practically completely converted into a ring gear (75)-movement, a braking effect of the centrifugal brake 13 being triggered at sufficiently high acceleration above an acceleration threshold value. The braking torque of the centrifugal brake 13 is transmitted back to the eccentric 103 via the planetary gear 7, which is translated by the planetary gear stages of the further gear 107, and brakes its rotary motion and consequently the linear motion of the valve member 113. This prevents the valve member 113 from moving into the predetermined safety position (usually a closed position) in a jerky manner, so that damage to the valve member 113 is avoided.

FIG. 3 shows a different, alternative configuration of the disclosure-based final controlling device 102 according to an exemplary embodiment. The main difference between the final controlling device 102 and the final controlling device 101 described above is that the drive axis A of the actuator 1 is arranged parallel to the eccentric rotary axis E. To bridge the radial distance between the drive axis A and the eccentric rotary axis E, a spur gear 109 is mounted on the housing 137 of the final controlling device 102 so as to transmit torque between the output shaft 3 and the eccentric rotary axis E. The spur gear 109 is mounted on the housing 137 of the final controlling device 102. In addition to the stepped spur gear 109 for bridging the distance between the drive axis A and the eccentric rotary axis E, a second, further gear 107' of the eccentric 103 comprises a second stepped spur gear 119 which is mounted coaxially to the eccentric rotary axis E so as to be rotatable about the eccentric bearing axis 121' which is fixed to the housing. The second gear 107', similar to the further gear 107 of the final controlling device 101 described above, comprises a two-stage reduction planetary gear whose input stage forms the stepped second spur gear 119.

The housing of the final controlling device 102 is essentially divided into two housing halves 135' and 137. Compared to the axial expansion of the eccentric bearing axis 121' and the motor shaft 21, the axial expansion of the first half of the 137 housing is much smaller than that of the second half of the 135' housing. The first half of the 137 housing can also be referred to as the housing cover. In the following, the second half of the 135' housing is referred to as the housing shell. The housing shell 135' comprises two chambers arranged parallel to each other, whereby the actuator 1 with the electric motor 5, the coupling 11, the optional centrifugal brake 13 and the optional gear 7 is arranged in one chamber. The eccentric 103, the spring mechanism 105 and the planetary gear stages of the further gear 107 as well as the optional second spur gear 119 are accommodated in the second chamber of the 135' housing shell. The eccentric bearing shaft 121 extends in its axial direction E through the eccentric 103 and through the planetary gear stages of the other gear unit 107'. The bearing axle 121' is fixed at its two opposite ends in the housing halves 135', 137.

The function of the eccentric 103, also taking into account the spring mechanism 105 of the plunger 111 and the coupling 11 as well as the centrifugal brake 13, essentially corresponds to the function described above with regard to the final controlling device 101 as shown in FIG. 2 in the case of the final controlling device 102 as shown in FIG. 3. The two-stage planetary gear of the other gear unit 107, 107' also acts essentially in the same way in both versions.

In both final controlling devices 101 and 102, the coupling 11 and the electric motor 5 are connected to each other in a rotationally fixed manner via a fastening section 35. This mounting section 35 can also be used to fix actuator 1 in one half of the housing 135 or 135'. For this purpose, the mounting section 35 can, for example, be configured as a flange for mounting to the housing half 135, 135' of the final controlling device 101 or 102.

The features revealed in the above description, figures and claims may be relevant, either individually or in any combination, to the realization of the disclosure in its various forms.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

REFERENCE LIST

| | |
|---|---|
| 1 | actuator |
| 3 | output shaft |
| 5 | electric motor |
| 7 | planetary gear |
| 10 | electromagnet |
| 11 | electromagnetic clutch |
| 12 | rotatable coupling part |
| 13 | centrifugal brake |
| 15 | stationary coupling part |
| 17 | brake pot |
| 21 | motor shaft |
| 23, 25 | ball bearing |
| 27 | hollow shaft |
| 35 | actuator housing |
| 71 | sun gear |
| 73 | planet gear bridge |
| 75 | ring gear |
| 76 | planet gear |
| 101, 102 | final controlling device |
| 103 | eccentric |
| 105 | spring mechanism |
| 107, 107' | further gear |
| 109, 119 | spur gear |

| | |
|---|---|
| 111 | plunger |
| 113 | control valve |
| 121, 121' | eccentric bearing axis |
| 135, 135' | drive housing |
| 137 | housing cover |
| 139 | eccentric housing |
| A | motor rotation axis |
| E | eccentric rotation axis |

The invention claimed is:

1. An electric actuator for a final controlling device with safety control function for positioning an actuating element, the electric actuator including an electric motor configured to provide a torque for actuating the actuating element, the electric motor comprising:
- a motor shaft configured to output the torque,
- an output shaft configured to transmit the torque from the electric motor to the actuating element,
- a coupling configured to provide and/or interrupt a torque-transmitting connection between the motor shaft and the output shaft, wherein the output shaft, the motor shaft, and the coupling are arranged coaxially to each other, and
- a planetary gear arranged coaxially with the output shaft and configured to transmit the torque from the electric motor to the output shaft, wherein the motor shaft is configured to provide the torque from the electric motor to the planetary gear, the planetary gear including a ring gear that is rotationally fixed relative to a rotationally movable part of the coupling.

2. The electric actuator according to claim 1, wherein the planetary gear has exactly one gear stage configured as a reduction gear stage.

3. The electric actuator according to claim 1, wherein:
the output shaft is realized at least in sections as a planetary bridge of the gear or a planetary bridge connected directly to the output shaft in a torque-transmitting force-locking and/or positive-locking manner, and/or
the motor shaft is connected in a torque-proof manner to a sun gear of the gear.

4. The electric actuator according to claim 1, wherein the electric motor is configured with a constant nominal speed of at least 200 revolutions per minute (rpm) and/or such that a direction of rotation of the electric motor is reversible.

5. The electric actuator according to claim 1, wherein the electric actuator comprises a centrifugal brake arranged coaxially with the output shaft and non-rotatably connected to the gear and/or the coupling.

6. The electric actuator according to claim 1, wherein electric actuator further comprises a transmission, the motor shaft extending in an axial direction of the motor shaft from the transmission to the electric motor through the coupling.

7. The electric actuator according to claim 1, wherein the motor shaft is surrounded in axial sections in a radial direction by a hollow shaft that is rotatably movable relative to the motor shaft and/or is slidably mounted on the motor shaft, the hollow shaft being non-rotatably connected to a torque transmission component or a torque transfer component of the gear and/or a rotationally movable part of the coupling.

8. The electric actuator according to claim 1, wherein the motor shaft extends through a stator and/or a rotor of the electric motor, the motor shaft being mounted rotatably in an axial direction on both sides of the electric motor a respective ball bearing.

9. A controlling device operable to perform one or more safety control functions, comprising:
- the electric actuator of claim 1,
- the actuating element that is configured to adjust a process fluid flow of a process-technical plant, and
- an eccentric or spindle drive configured to be operated by the output shaft to linearly actuate the electric actuator.

10. The controlling device according to claim 9, further comprising a rotational spring mechanism configured to move the actuating element into a safety position when the coupling and/or the electric motor is de-energized.

11. The controlling device according to claim 10, wherein the spring mechanism is arranged coaxially with the output shaft and/or on an output side relative to the gear.

12. The electric actuator according to claim 1, wherein the electric actuator comprises a centrifugal brake arranged coaxially with the output shaft and non-rotatably connected to the ring gear of the gear.

13. The electric actuator according to claim 1, wherein the coupling is an electromagnetic clutch or a current-less uncoupling clutch.

14. The electric actuator according to claim 1, wherein the actuating element is a valve element.

* * * * *